US012715134B2

(12) United States Patent
Bunno et al.

(10) Patent No.: US 12,715,134 B2
(45) Date of Patent: Aug. 25, 2026

(54) ROBOT CONTROL APPARATUS, ROBOT CONTROL SYSTEM, AND ROBOT CONTROL METHOD

(71) Applicant: KYOCERA Corporation, Kyoto (JP)

(72) Inventors: Sho Bunno, Ibaraki (JP); Masato Mori, Osaka (JP); Takuya Miyamoto, Kadoma (JP); Takayuki Ishida, Hirakata (JP); Hiroaki Miyamura, Fujisawa (JP)

(73) Assignee: KYOCERA Corporation, Kyoto (JP)

( * ) Notice: Subject to any disclaimer, the term of this patent is extended or adjusted under 35 U.S.C. 154(b) by 141 days.

(21) Appl. No.: 18/714,059

(22) PCT Filed: Nov. 29, 2022

(86) PCT No.: PCT/JP2022/044046

§ 371 (c)(1),
(2) Date: May 28, 2024

(87) PCT Pub. No.: WO2023/095926

PCT Pub. Date: Jun. 1, 2023

(65) Prior Publication Data

US 2025/0050502 A1 Feb. 13, 2025

(30) Foreign Application Priority Data

Nov. 29, 2021 (JP) ................................ 2021-193660

(51) Int. Cl.
*B25J 9/16* (2006.01)

(52) U.S. Cl.
CPC ........... *B25J 9/1676* (2013.01); *B25J 9/1653* (2013.01); *B25J 9/1664* (2013.01)

(58) Field of Classification Search
CPC ...... B25J 9/1676; B25J 9/1653; B25J 9/1664; B25J 9/1666; B25J 19/06;

(Continued)

(56) References Cited

U.S. PATENT DOCUMENTS 9,579,798 B2 * 2/2017 Wang ..................... B25J 9/1694
9,701,014 B2 * 7/2017 Oguri ..................... B25J 9/1612

(Continued)

FOREIGN PATENT DOCUMENTS

CN 110696000 A * 1/2020 ........... B25J 9/1605
CN 110696000 B 12/2020

(Continued)

OTHER PUBLICATIONS

Je, HW., Baek, JY. & Lee, M.C. Current based compliance control method for minimizing an impact force at collision of service robot arm. Int. J. Precis. Eng. Manuf. 12, 251-258 (2011). https://doi.org/10.1007/s12541-011-0034-7 (Year: 2011).*

(Continued)

*Primary Examiner* — Robert T Nguyen

(74) *Attorney, Agent, or Firm* — Procopio, Cory, Hargreaves & Savitch LLP

(57) ABSTRACT

A robot control apparatus includes a controller configured to control a robot. The controller includes an operation control unit and a state estimation unit. The operation control unit is configured to cause the robot to operate along a first operation path. The state estimation unit is configured to estimate a state of the robot. When the state estimation unit detects collision with at least a part of the robot, the operation control unit is configured to acquire an avoidance operation path on which the robot would operate to mitigate energy of the collision. Upon acquiring the avoidance operation path, the operation control unit is configured to cause the robot to execute an avoidance operation along the avoidance operation path.

16 Claims, 4 Drawing Sheets

(58) Field of Classification Search
CPC ........... G05B 2219/39082; G05B 2219/40201; G05B 2219/40202; G05B 2219/40476
See application file for complete search history.

(56) References Cited

U.S. PATENT DOCUMENTS

| | | | | |
|---|---|---|---|---|
| 10,369,697 | B2 | 8/2019 | Dalibard et al. | |
| 11,192,244 | B2 | 12/2021 | Nakamura et al. | |
| 11,207,777 | B2 | 12/2021 | Nakasu et al. | |
| 11,762,390 | B1 * | 9/2023 | Alagic | G06F 18/211 701/23 |
| 11,992,285 | B2 * | 5/2024 | Hares | B25J 9/1674 |
| 2003/0225479 | A1 * | 12/2003 | Waled | B25J 9/161 700/245 |
| 2011/0066282 | A1 * | 3/2011 | Bosscher | B25J 9/1676 700/255 |
| 2013/0300537 | A1 * | 11/2013 | Bajo | B25J 9/163 340/8.1 |
| 2018/0141213 | A1 * | 5/2018 | Tsao | B25J 9/1676 |
| 2021/0094187 | A1 * | 4/2021 | Kanemoto | B25J 13/085 |
| 2021/0362336 | A1 * | 11/2021 | Muneto | B25J 9/1651 |
| 2022/0097231 | A1 * | 3/2022 | Oyama | B25J 9/1666 |
| 2022/0118621 | A1 * | 4/2022 | Paulitsch | B25J 13/089 |
| 2022/0233271 | A1 * | 7/2022 | Peine | A61B 90/06 |
| 2023/0038804 | A1 | 2/2023 | Kamon et al. | |
| 2024/0375276 | A1 * | 11/2024 | Yokoya | B25J 13/085 |
| 2025/0236018 | A1 * | 7/2025 | Hu | B25J 9/1653 |

FOREIGN PATENT DOCUMENTS

| | | | | |
|---|---|---|---|---|
| JP | H06-138941 | A | | 5/1994 |
| JP | 2010069585 | A | * | 4/2010 |
| JP | 2017-516674 | A | | 6/2017 |
| JP | 2019-81234 | A | | 5/2019 |
| JP | 2019-123022 | A | | 7/2019 |
| JP | 2020010447 | A | | 1/2020 |
| KR | 101968751 | B1 | | 8/2019 |
| WO | 2020/045483 | A1 | | 3/2020 |
| WO | 2021/117701 | A1 | | 6/2021 |

OTHER PUBLICATIONS

Haddadin, S. Towards Safe Robots: Approaching Asimov's 1st Law. https://doi.org/10.1007/978-3-642-40308-8 (Year: 2013).*

Machine translation of CN-110696000-A.*

Machine translation of JP-2010069585-A.*

Je et al., "Current based Compliance Control Method for Minimizing an Impact Force at Collision of Service Robot Arm", International Journal of Precsion Engineering and Manufacturing, vol. 12, No. 2, pp. 251-258, Apr. 2011, 8 pages.

Na et al., "Collision Recognition and Direction Changes Using Fuzzy Logic for Small Scale Fish Robots by Acceleration Sensor Data", FSKC 2005, LNAI3614, pp. 329-338, 2005.

Dumonteil et al., "Reactive Planning on Collaborative Robot for Industrial Applications", 8 pages.

Haddadin, "Towards Safe Robots: Approaching Asimovs 1st Law", Springer, 386 pages.

* cited by examiner 1
10
ROBOT CONTROL APPARATUS
STATE ESTIMATION UNIT
20
OPERATION PLANNING UNIT
30
OPERATION CONTROL UNIT
40
PLANT MODEL
50
INTERFACE
60
TARGET DESIGNATION UNIT
70
SPATIAL INFORMATION ACQUISITION UNIT
80
SENSOR
3
ROBOT
2
CAMERA
4

ROBOT CONTROL APPARATUS, ROBOT CONTROL SYSTEM, AND ROBOT CONTROL METHOD

CROSS-REFERENCE TO RELATED APPLICATIONS

This application claims priority based on Japanese Patent Application No. 2021-193660 (filed Nov. 29, 2021), the entire disclosure of which is hereby incorporated by reference.

TECHNICAL FIELD

The present disclosure relates to a robot control apparatus, a robot control system, and a robot control method.

BACKGROUND OF INVENTION

A known system executes a reverse retraction mode to reverse the operation trajectory of a robot when an external force acting on the robot equals or exceeds a predetermined threshold value, and executes an external force reducing retraction mode when the external force does not decrease even after executing the reverse retraction mode (see, Patent Literature 1, for example).

CITATION LIST

Patent Literature

Patent Literature 1: Japanese Unexamined Patent Application Publication No. 2019-81234

SUMMARY

In an embodiment of the present disclosure, a robot control apparatus includes a controller configured to control a robot. The controller includes an operation control unit and a state estimation unit. The operation control unit is configured to cause the robot to operate along a first operation path. The state estimation unit is configured to estimate a state of the robot. When the state estimation unit detects collision with at least a part of the robot, the operation control unit is configured to acquire an avoidance operation path on which the robot would operate to mitigate energy of the collision. Upon acquiring the avoidance operation path, the operation control unit is configured to cause the robot to execute an avoidance operation along the avoidance operation path.

In an embodiment of the present disclosure, a robot control system includes the robot control apparatus and the robot.

In an embodiment of the present disclosure, a robot control method includes causing a robot to operate along a first operation path. The robot control method includes acquiring, upon detecting collision with at least a part of the robot, an avoidance operation path on which the robot would operate to mitigate energy of the collision. The robot control method includes causing, upon acquiring the avoidance operation path, the robot to execute an avoidance operation along the avoidance operation path.

DESCRIPTION OF EMBODIMENTS

When a robot contacts a human or the like, simply reversing the operation trajectory of the robot may cause the robot to contact the human or the like even more strongly, or to contact another human or the like. Improved reliability of an avoidance action by a robot is desirable.

Ensuring the safety of industrial robots has necessitated various measures, such as enclosing a robot with a gauge to prevent humans from entering the working range of the robot, or using sensors such as a laser curtain to detect human intrusion and stop the operation of the robot. In contrast, some robots operate as a cooperative robot with reduced power and operating speed so that the robot can perform cooperative tasks with a human, in close proximity to the human. Cooperative tasks include tasks performed by a human and a robot working together, tasks performed by robots working together, or tasks performed by a robot and another machine working together. Cooperative tasks include collaborative tasks performed by a human and a robot working together.

One conceivable method is to detect the force applied from a robot to a human on the basis of information such as a motor current of the robot and stop the operation of the robot, so that the force applied to the human due to contact or collision with the robot is limited to a force smaller than a permissible contact force. The method in this case requires extreme reductions in the power and operating speed of the cooperative robot to ensure that the force applied from the robot to the human does not reach or exceed the permissible contact force. Such reductions in power and operating speed create difficulties in causing the cooperative robot to exhibit the original function and performance thereof.

Figure 1:
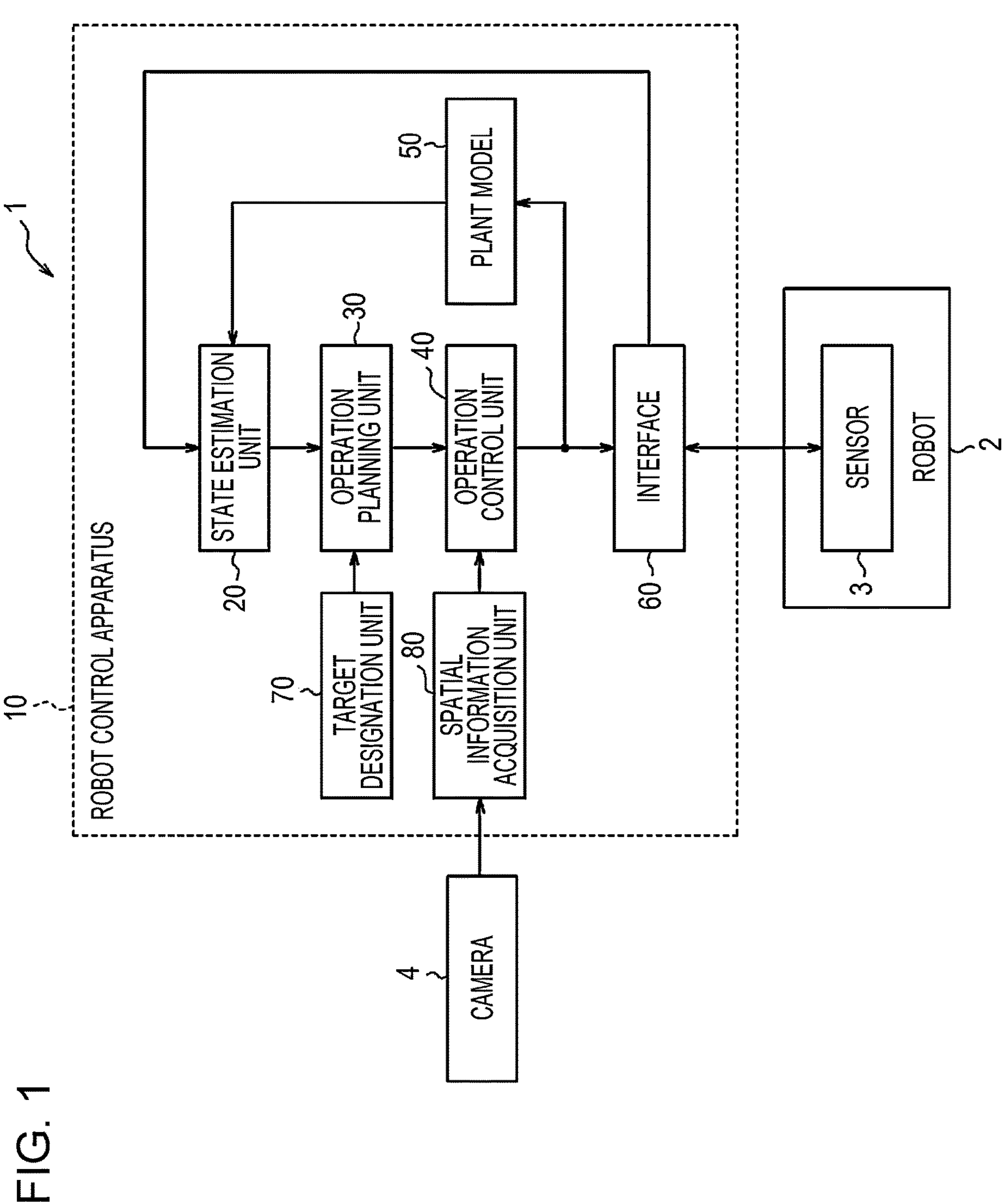
FIG. 1 is a block diagram illustrating an example of the configuration of a robot control system according to an embodiment.

As illustrated in FIG. 1, according to one embodiment, a robot control system 1 includes a robot 2 and a robot control apparatus 10. The robot control apparatus 10 controls the operation of the robot 2.

Figure 2:
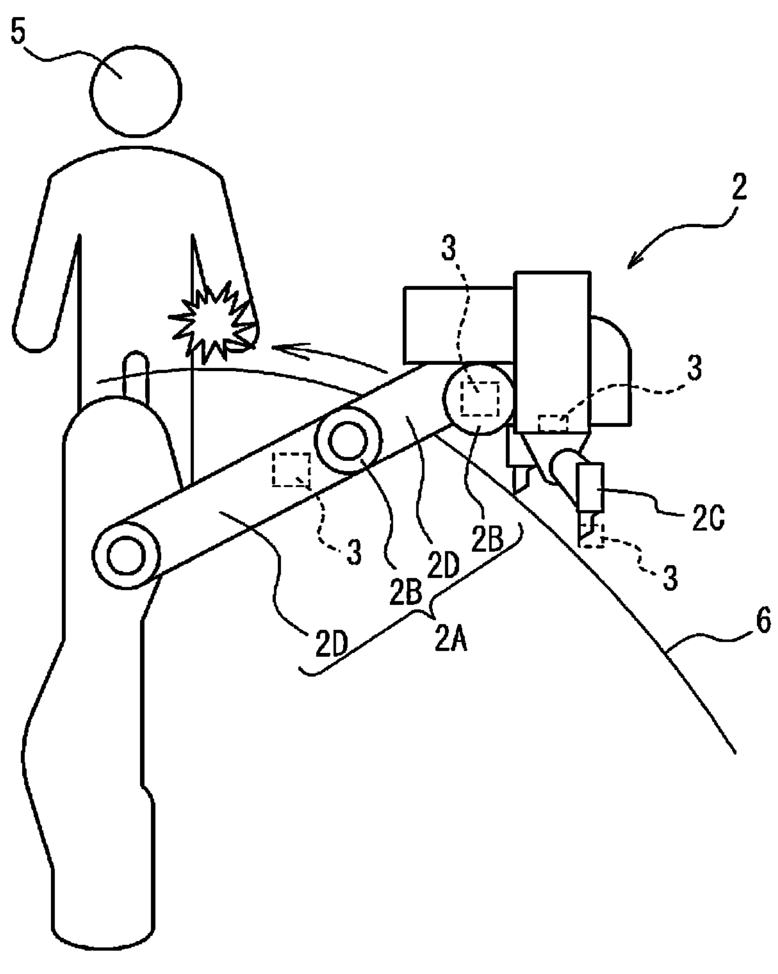
FIG. 2 is a schematic diagram illustrating an example of the configuration of a robot control system according to an embodiment.

As illustrated in FIG. 2 as a schematic diagram, a human 5 may be located on a movement path 6 of the robot 2 in the robot control system 1 according to the present embodiment. If the robot 2 moves toward the human 5 along the movement path 6, at least a part of the robot 2 may contact or collide with the human 5 located on the movement path 6. In the present embodiment, the robot 2 has an arm 2A and an end effector 2C. The arm 2A includes at least one joint 2B and at least two links 2D joined to the joint 2B. In this case, at least one selected from the group consisting of the arm 2A, the joint 2B, the links 2D, and the end effector 2C may contact or collide with the human 5.

To reduce the effect on the human 5 when the robot 2 contacts or collides with the human 5, the robot control apparatus 10 may operate as follows, for example. The robot control apparatus 10 estimates the magnitude and direction of an external force or disturbance torque applied to the robot 2. The external force or disturbance torque applied to the robot 2 when the robot 2 contacts or collides with the human 5 includes the reaction force of the force applied from the robot 2 to the human 5. The robot control apparatus 10 uses the result of estimating the external force or disturbance torque as a basis for dynamically changing the operation path of the robot 2 or stopping the robot 2 to reduce the external force or disturbance torque. This arrangement may reduce the force applied to the human 5 when the robot 2 contacts or collides with the human 5.

The robot control apparatus 10 acquires the path on which the robot 2 is to operate when the robot 2 executes a task. The operation when the robot 2 executes a task is also referred to as the normal operation. The path on which the robot 2 is to operate when the robot 2 executes a task is also referred to as the first operation path. The robot control apparatus 10 causes the robot 2 to operate along the first operation path. The robot control apparatus 10 may acquire the first operation path as a result of the robot control apparatus 10 itself generating the first operation path. The robot control apparatus 10 may also acquire the first operation path from another apparatus.

When the robot 2 contacts or collides with the human 5 while in operation, the current flowing through a motor that drives the robot 2 may increase. The robot control apparatus 10 can estimate an external force or disturbance torque applied to the robot 2 on the basis of the disparity between the motor current expected when causing the robot 2 to operate along the first operation path and the actual motor current. The motor current may be detected by a current sensor or the like.

When the robot 2 contacts or collides with the human 5 while in operation, the operation speed of the arm 2A of the robot 2, including the links 2D, the joint 2B, or the like, may change. The robot control apparatus 10 can estimate an external force or disturbance torque applied to the robot 2 on the basis of the disparity between the speed of each link 2D or each joint 2B expected when causing the robot 2 to operate along the first operation path and the actual speed of each link 2D or each joint 2B. The speed of each link 2D or each joint 2B may be detected by an acceleration sensor or the like.

The robot control apparatus 10 can estimate the magnitude and direction of the force that the robot 2 applies to the human 5 on the basis of the result of estimating the external force or disturbance torque applied to the robot 2. The magnitude and direction of the force that the robot 2 applies to the human 5 are expressed as a collision vector. That is, the robot control apparatus 10 can estimate the collision vector with respect to the human 5 on the basis of the result of estimating the external force or disturbance torque applied to the robot 2.

The robot control apparatus 10 may acquire an operation path for mitigating collision on the basis of the result of estimating the collision vector. Collision may be mitigated by slowing down or stopping the robot 2 to reduce the force that the robot 2 applies to the human 5. The robot control apparatus 10 may acquire an operation path for avoiding contact or collision on the basis of the result of estimating the collision vector. Contact or collision may be avoided by moving the robot 2 in a direction away from the human 5. An operation for mitigating collision or for avoiding contact or collision is also referred to as an avoidance operation. An operation path for mitigating collision or for avoiding contact or collision is also referred to as an avoidance operation path. The robot control apparatus 10 may acquire the avoidance operation path as a result of the robot control apparatus 10 itself generating the avoidance operation path. The robot control apparatus 10 may also acquire the avoidance operation path from another apparatus. In this way, calculating or acquiring the avoidance operation path for mitigating collision when the robot 2 collides and causing the robot 2 to perform an avoidance operation on the basis thereof can result in improved reliability of the avoidance operation, as compared to the case of not calculating or acquiring the avoidance operation path and simply controlling the robot 2 to move backward on the path that the robot 2 had been operating on until colliding.

The following describes each component of the robot control system 1, with reference to FIGS. 1 and 2.

<Robot 2>

The robot 2 includes the arm 2A and the end effector 2C. The arm 2A includes the joint 2B and the links 2D joined to the joint 2B. The arm 2A may be configured as a 6-axis or 7-axis vertical articulated robot, for example. The arm 2A may also be configured as a 3-axis or 4-axis horizontal articulated robot, for example. The arm 2A may also be configured as a 2-axis or 3-axis Cartesian robot. The arm 2A may also be configured as a parallel link robot or the like. The number of axes forming the arm 2A is not limited to the examples given.

The end effector 2C may include, for example, a grasping hand configured to grasp a work object. The grasping hand may have a plurality of fingers. The grasping hand may have two or more fingers. Each finger on the grasping hand may have one or more joints. The end effector 2C may also include a suction hand configured to suction a work object. The end effector 2C may also include a scooping hand configured to scoop up a work object. The end effector 2C may also include a drill or other tool and may be configured to perform any of various machining operations, such as drilling a hole in a work object. The end effector 2C is not limited to these examples and may be configured to perform any of various other operations.

The robot control apparatus 10 can control the position of the end effector 2C by controlling the angle of the joint 2B of the robot 2. The end effector 2C may have an axis that serves as a reference in the direction of action with respect to a work object. When the end effector 2C has an axis, the robot control apparatus 10 can control the direction of the axis of the end effector 2C by controlling the angle of the joint 2B. The robot control apparatus 10 controls the start and end of an operation in which the end effector 2C acts on a work object. The robot control apparatus 10 can move or machine a work object by controlling the operation of the end effector 2C while controlling the position of the end effector 2C or the direction of the axis of the end effector 2C.

<Sensor 3>

The robot control system 1 may further include at least one sensor 3. The sensor 3 detects physical information about the robot 2. Physical information about the robot 2 may include information about the real position or orientation of at least one configuration portion of the robot 2, or information pertaining to the velocity or acceleration of at least one configuration portion of the robot 2. Physical information about the robot 2 may include information pertaining to a force that acts on at least one configuration portion of the robot 2. Physical information about the robot 2 may include information pertaining to a current flowing through, or a torque of, a motor that drives at least one configuration portion of the robot 2. Physical information about the robot 2 represents a result of the actual operation of the robot 2. That is, the robot control system 1 can ascertain the result of the actual operation of the robot 2 by acquiring physical information about the robot 2.

The sensor 3 may include a force sensor or haptic sensor that detects a force, distributed pressure, slip, or the like acting on at least a part of the robot 2 as physical information about the robot 2. The sensor 3 may include an acceleration sensor that detects the acceleration of at least a part of the robot 2 as physical information about the robot 2. The sensor 3 may include a motion sensor that detects the position or orientation, or the velocity or acceleration, of at least a part of the robot 2 as physical information about the robot 2. The sensor 3 may include a current sensor that detects a current flowing through a motor that drives the robot 2 as physical information about the robot 2. The sensor 3 may include a torque sensor that detects a torque of a motor that drives the robot 2 as physical information about the robot 2.

The sensor 3 may be installed in/on the joint 2B of the robot 2 or in/on a joint driver such as a motor that drives the joint 2B. The sensor 3 may be installed in/on the links 2D of the robot 2. The sensor 3 may also be installed between the arm 2A and the end effector 2C of the robot 2. The robot 2 may also be installed in/on the end effector 2C of the robot 2. In the present embodiment, a current sensor is assumed to be installed in/on the joint 2B. An acceleration sensor is assumed to be installed in/on the links 2D. A haptic sensor is assumed to be installed in/on a distal end (a finger, for example) of the end effector 2C. A force sensor is assumed to be installed between the end effector 2C and the arm 2A. Note that the current sensor may be any sensor capable of measuring a current value, and may be a sensor of the resistance-detecting type or the magnetic-field-detecting type, for example. The acceleration sensor may be any sensor capable of measuring acceleration, and may be a sensor of the frequency change type, the piezoelectric type, the piezoresistive type, or the electrostatic capacitance type.

The sensor 3 outputs detected physical information about the robot 2 to the robot control apparatus 10. The sensor 3 detects and outputs physical information about the robot 2 at certain timings. The sensor 3 outputs physical information about the robot 2 as time series data.

<Camera 4>

The robot control system 1 may further include a camera 4. The camera 4 takes an image of an article or human located in a range of influence that may affect the operation of the robot 2. An image taken by the camera 4 may include monochrome luminance information, and may also include multicolor luminance information expressed in red, green, and blue (RGB) or the like. The range of influence includes an operating range of the robot 2. The range of influence may also be set as a range extended outward past the operating range of the robot 2. The range of influence may be set so that if a human or the like moves from the outside of the range of influence toward the inside of the operating range of the robot 2, the robot 2 can be stopped before the human or the like enters the inside of the operating range of the robot 2. The range of influence may also be set to a range extended outward a certain distance from the boundary of the operating range of the robot 2, for example. The camera 4 may also be installed so that the camera 4 can take an image overlooking the range of influence or operating range of the robot 2, or the surrounding area. One camera 4 may be present. Two or more cameras 4 may also be present. Note that the camera 4 is connected to the robot control apparatus 10 by a wired or wireless means. The robot control apparatus 10 is configured to acquire information taken by the camera 4.

<Robot Control Apparatus 10>

The robot control apparatus 10 acquires physical information about the robot 2. The robot control apparatus 10 plans the operation of the robot 2 and generates information for controlling the robot 2, on the basis of physical information about the robot 2. The information for controlling the robot 2 is also referred to as control information. The robot control apparatus 10 estimates ideal operation of the robot 2 based on control information, and provides the result of comparing the estimated operation with the actual operation as feedback regarding the planning of the operation of the robot 2 and the generation of control information.

Specifically, the robot control apparatus 10 includes a state estimation unit 20, an operation planning unit 30, an operation control unit 40, a plant model 50, an interface 60, and a target designation unit 70. The state estimation unit 20 and the operation control unit 40 are also referred to as a controller. That is, the controller includes the state estimation unit 20 and the operation control unit 40. The controller is configured to control the robot 2. The operation planning unit 30 may be achieved as a configuration included in the controller, as a configuration separate from the controller, or as a function of an external server.

The robot control apparatus 10 may include at least one processor to provide control and processing power for executing various functions. At least one configuration portion of the robot control apparatus 10 may include at least one processor. A plurality of configuration portions of the robot control apparatus 10 may be achieved by a single processor. The entirety of the robot control apparatus 10 may also be achieved by a single processor. The processor may execute a program to achieve the various functions of the robot control apparatus 10. The processor may be achieved as a single integrated circuit. An integrated circuit is also referred to as an IC. The processor may be achieved as a plurality of communicatively connected integrated circuits and discrete circuits. The processor may be achieved on the basis of any of various other known technologies.

The robot control apparatus 10 may include storage. The storage may include an electromagnetic storage medium such as a magnetic disk, or a memory such as semiconductor memory or magnetic memory. The storage stores various information, programs to be executed by the robot control apparatus 10, and the like. The storage may function as a working memory of the robot control apparatus 10. At least a portion of the storage may be configured as a separate entity from the robot control apparatus 10.

The robot control apparatus 10 may include a communication device configured to communicate in a wired or wireless way. The communication device may be configured to communicate according to a communication scheme based on any of various communication standards.

The robot control apparatus 10 may include one or more servers. The robot control apparatus 10 may be configured to cause a plurality of servers to execute parallel processing. The robot control apparatus 10 does not necessarily include a physical housing, and may also be configured on the basis of virtualization technology such as a virtual machine or a container orchestration system. The robot control apparatus 10 may also be configured using a cloud service. When configured using a cloud service, the robot control apparatus 10 may be configured by combining managed services. In other words, the functions of the robot control apparatus 10 may be achieved as a cloud service.

The robot control apparatus 10 may include at least one server cluster and at least one database cluster. The server cluster functions as the controller of the robot control apparatus 10. The database cluster functions as the storage of the robot control apparatus 10. One server cluster may be present. Two or more server clusters may also be present. In the case of one server cluster, the functions achieved by the one server cluster encompass the functions achieved by each server cluster. The server clusters are communicatively connected to each other in a wired or wireless way. One database cluster may be present. Two or more database clusters may also be present. The number of database clusters may be increased or decreased, as appropriate, on the basis of the volume of data to be managed by the robot control apparatus 10 and the availability requirements of the robot control apparatus 10. The database cluster is communicatively connected to the server cluster in a wired or wireless way. The robot control apparatus 10 may also be connected to an external database. A system including the robot control apparatus 10 and the external database may also be configured.

The robot control apparatus 10 is illustrated as a single configuration in FIG. 1, but a plurality of configurations may be managed as a single system if necessary. In other words, the robot control apparatus 10 is configured as a scalable platform. By using a plurality of configurations as the robot control apparatus 10, even if one configuration becomes inoperable due to a natural disaster or other unforeseen event, the system will continue to operate using the other configuration(s). In this case, the plurality of configurations are interconnected by a wired and/or wireless channel and are capable of communicating with each other. The plurality of configurations may also be built across cloud services and on-premises environments.

The robot control apparatus 10 is communicatively connected to at least one configuration of the robot control system 1 by a wired and/or wireless channel. The robot control apparatus 10 and the at least one configuration of the robot control system 1 are mutually equipped with interfaces using a standard protocol, allowing for bidirectional communication.

The following describes each configuration portion of the robot control apparatus 10.

<<Interface 60>>

The interface 60 acquires physical information from the robot 2 and outputs the physical information to the state estimation unit 20 and the operation planning unit 30. The interface 60 acquires control information for the robot 2 from the operation control unit 40, and outputs the control information to the robot 2.

The interface 60 may acquire physical information about the robot 2 as a result of detection by the sensor 3. The interface 60 may also employ estimation to acquire physical information that the sensor 3 cannot detect directly. Physical information that the interface 60 can acquire includes information representing the actual position, orientation, and operation of the robot 2, and is also referred to as real physical information.

<<Target Designation Unit 70>>

The target designation unit 70 generates information designating a target on which the robot 2 is to operate, and outputs the generated information to the operation planning unit 30. Information designating a target on which the robot 2 is to operate is also referred to as a target designation. The target designation unit 70 may include an input device that accepts input specifying the target of the robot 2 from a worker who performs work using the robot 2. The target designation unit 70 may generate a target designation on the basis of input from the worker, and output the target designation to the operation planning unit 30. The target designation unit 70 may also acquire a target designation from an external apparatus, and output the target designation to the operation planning unit 30. The target designation unit 70 may also acquire a target designation from the state estimation unit 20 when collision is detected.

<<Plant Model 50>>

The plant model 50 is a model representing the ideal state of the robot 2. The plant model 50 accepts the input of a control input for the robot 2, and outputs physical information about the robot 2 that would be obtained assuming the robot 2 operates ideally on the basis of the control input. Physical information about the robot 2 that would be obtained assuming the robot 2 operates ideally on the basis of a control input is also referred to as estimated physical information. That is, the plant model 50 generates and outputs estimated physical information by accepting a control input as input and simulating the operation of the robot 2. The plant model 50 outputs the estimated physical information to the state estimation unit 20.

<<State Estimation Unit 20>>

The state estimation unit 20 estimates the state of the robot 2 on the basis of the real physical information acquired from the interface 60 and the estimated physical information acquired from the plant model 50. The state estimation unit 20 may estimate the state of the robot 2 on the basis of the disparity between the real physical information and the estimated physical information. The state estimation unit 20 outputs the result of estimating the state of the robot 2 to the operation planning unit 30. The state estimation unit 20 detects collision of the human 5 or the like with at least a part of the robot 2 on the basis of the result of estimating the external force applied to the robot 2. The state estimation unit 20 may detect that the human 5 or the like has collided with the robot 2 when the estimated external force is a collision threshold value or greater. The collision threshold value may be set as appropriate. Upon detecting collision of the human 5 or the like with at least a part of the robot 2, the state estimation unit 20 may output to the operation planning unit 30 an indication that collision is detected. Upon detecting collision, the state estimation unit 20 may output a target designation to the target designation unit 70 to cause the robot 2 to execute an avoidance operation.

<<Spatial Information Acquisition Unit 80>>

The robot control apparatus 10 may further include a spatial information acquisition unit 80. The spatial information acquisition unit 80 acquires spatial point cloud information pertaining to an object present in a space as spatial information. Spatial point cloud information is information representing a space by using a point cloud. The spatial information acquisition unit 80 may acquire RGB information about the space as spatial information. The spatial information acquisition unit 80 outputs spatial information to the operation planning unit 30.

The robot control system 1 may include a visual sensor that detects spatial point cloud information. The spatial information acquisition unit 80 may acquire spatial point cloud information from the visual sensor. The visual sensor may be installed at a location overlooking the entire robot 2, such as the links 2D or joint 2B of the arm 2A of the robot 2, the distal end of the end effector 2C, or the like, the range of influence of the robot 2, or the surroundings of the range of influence of the robot 2.

The spatial information acquisition unit 80 may acquire a captured image from the camera 4. The spatial information acquisition unit 80 may also include the camera 4. The camera 4 may be installed on/in the links 2D or joint 2B of the arm 2A of the robot 2, the distal end of the end effector 2C, or the like. The spatial information acquisition unit 80 acquires RGB information of the captured image acquired from the camera 4. The spatial information acquisition unit 80 may detect spatial point cloud information on the basis of depth information of the captured image. Depth information include information pertaining to the depth of a subject of the camera 4.

<<Operation Planning Unit 30>>

The operation planning unit 30 acquires the result of estimating the state of the robot 2 from the state estimation unit 20. The operation planning unit 30 acquires a target designation from the target designation unit 70. The operation planning unit 30 acquires spatial information from the spatial information acquisition unit 80. On the basis of the result of estimating the state of the robot 2, the target designation, and the spatial information, the operation planning unit 30 plans a first operation path of the robot 2 so that the robot 2 does not contact a nearby object, such as an article or human, located in the range of influence shot by the camera 4. Specifically, the operation planning unit 30 may set a start point, end point, or waypoint of a path on which at least one configuration portion of the robot 2 is to move. The operation planning unit 30 may represent the start point, end point, or waypoint using spatial coordinate information defined by any coordinate system, such as an XYZ coordinate system. The operation planning unit 30 may also set the orientation of at least one configuration portion of the robot 2 at each position included on the path of the robot 2. The operation planning unit 30 may represent the orientation as an angle of at least one joint 2B of the robot 2.

The operation planning unit 30 may also calculate an avoidance operation path on which the robot 2 would execute an avoidance operation. The target designation unit 70 may set an operation start point and an operation end point of the avoidance operation. The operation end point of the avoidance operation may be set on the extension of the collision vector. The operation start point of the operation path of the avoidance operation may be set at the actual position of the robot 2 when collision is detected between the robot 2 and the human 5 or the like. The distance between the operation start point and the operation end point is determined according to the magnitude of the collision vector. The operation planning unit 30 acquires the operation start point and operation end point of the avoidance operation from the target designation unit 70, and calculates the operation path when causing the robot 2 to perform the avoidance operation. Note that the calculated avoidance operation path may be a second operation path different from the first operation path, and may also be the first operation path.

Note that the operation planning unit 30 may also acquire spatial information and use the spatial information as a basis for implementing an avoidance operation so as not to contact a nearby object in the range of influence shot by a camera. On the other hand, unlike during the normal operation, the operation planning unit 30 may prioritize the avoidance operation and need not acquire spatial information.

The operation planning unit 30 plans the operation of the robot 2 to cause the robot 2 to operate on the planned path. The operation planning unit 30 plans the velocity or angular velocity, or the acceleration or angular acceleration, of at least one configuration portion of the robot 2 at each position included on the path of the robot 2.

The operation planning unit 30 outputs information specifying at least one planned path or operation to the operation control unit 40. Information specifying at least one planned path or operation is also referred to as plan information.

<<Operation Control Unit 40>>

The operation control unit 40 generates a control input for the robot 2 to allow for appropriate control of the robot 2 on the basis of plan information acquired from the operation planning unit 30. The operation control unit 40 outputs the generated control input to the robot 2 through the interface 60. For example, the operation control unit 40 causes the robot 2 to operate along the first operation path. The control input for the robot 2 may include information for controlling the output of a motor that drives at least one joint 2B of the robot 2, for example.

(Example of Operation of Robot Control Apparatus 10)

As described above, the robot control apparatus 10 includes a controller. The controller includes the state estimation unit 20 and the operation control unit 40. The operation control unit 40 acquires information specifying the first operation path from the operation planning unit 30, and causes the robot 2 to operate along the first operation path.

The state estimation unit 20 detects collision with at least a part of the robot 2 on the basis of a result of estimating the state of the robot 2. The state estimation unit 20 outputs the result of detecting collision with at least a part of the robot 2 to the operation planning unit 30. On the basis of the result of detecting collision with at least a part of the robot 2, the operation planning unit 30 generates an operation path on which the robot 2 would operate to mitigate the energy of the collision. The avoidance operation path generated for an avoidance operation could be, as the result of being generated, the same route as the first operation path or a second operation path which is a different route from the first operation path.

The operation control unit 40 is configured to acquire information specifying an operation path for an avoidance operation from the operation planning unit 30. That is, the operation control unit 40 is configured to acquire information specifying an operation path for an avoidance operation when the state estimation unit 20 detects collision with at least a part of the robot 2. Upon acquiring information specifying the second operation path, the operation control unit 40 causes the robot 2 to execute an avoidance operation along the second operation path. By operating along the second operation path that is different from the first operation path, the robot 2 is configured to execute an avoidance operation in a different direction than when collision is detected along the first operation path. The robot 2 may also be configured such that, upon acquiring the first operation path as an operation path for an avoidance operation, the robot 2 executes the avoidance operation by operating to return on the same first operation path, rather than on the second operation path.

Note that the operation control unit 40 may also cause the robot 2 to operate on the basis of a confidence level of a collision estimation result by the state estimation unit 20. Specifically, for example, when the estimation result from the state estimation unit 20 has a small confidence level, an avoidance operation may be performed without causing the operation planning unit 30 to calculate an avoidance operation path. In this case, for example, the avoidance operation may cause the robot 2 to operate to go back on the same first operation path as during the normal operation.

The state estimation unit 20 estimates the state of the robot 2 when the robot 2 reaches the operation end point of the avoidance operation. The state estimation unit 20 estimates whether collision has been avoided or mitigated, on the basis of the result of estimating the external force applied to the robot 2. The state estimation unit 20 may detect whether the human 5 or the like is still colliding with the robot 2. The state estimation unit 20 may detect that the human 5 or the like is still colliding with the robot 2 when the external force applied to the robot 2 is the collision threshold value or greater. Upon detecting that the human 5 or the like is still colliding with the robot 2, the state estimation unit 20 may output to the operation planning unit 30 an indication that collision is detected. The state estimation unit 20 may output a target designation to the target designation unit 70 to cause the robot 2 to execute the avoidance operation again.

When the robot 2 executes the normal operation, the operation planning unit 30 determines the first operation path to control the position of the distal end of the arm 2A and the orientation of the end effector 2C. On the other hand, when the robot 2 executes the avoidance operation, the operation planning unit 30 may determine the second operation path so that the portion of the robot 2 (such as the link 2D, the joint 2B, or the end effector 2C) that collided with the human 5 or the like moves away from the collided entity (human 5 or the like).

When causing the robot 2 to execute the normal operation, the robot control apparatus 10 may in some cases move each link 2D and each joint 2B of the joint 2B in various directions to control the position of the distal end of the arm 2A and the orientation of the end effector 2C to be in a position and an orientation suited to a task. On the other hand, when causing the robot 2 to execute the avoidance operation, the robot control apparatus 10 may maintain the shape of the link(s) 2D and the joint 2B in the portion of the robot 2 closer to the distal end (the portion closer to the end effector 2C) than the link 2D or the joint 2B where collision is detected. While maintaining this shape, the robot control apparatus 10 may move the link 2D or the joint 2B where collision is detected away from the collided entity (human 5 or the like). In this case, the robot control apparatus 10 can move the link(s) 2D or the joint 2B in the portion farther away from the distal end (the portion farther away from the end effector 2C), including the link 2D or the joint 2B where collision is detected.

The avoidance operation that the robot 2 is to execute may be a 2D operation or a 3D operation. A 2D operation corresponds to moving each link 2D or each joint 2B within a single plane. A 3D operation corresponds to moving each link 2D or each joint 2B three-dimensionally, without being restricted to a plane.

The state estimation unit 20 may detect collision in a plurality of portions of the robot 2. For example, the state estimation unit 20 may estimate that an external force is applied to a plurality of links 2D or a plurality of joints 2B of the robot 2. The state estimation unit 20 may estimate that an external force is applied to at least one link 2D and at least one joint 2B of the robot 2. On the basis of these estimation results, the state estimation unit 20 may detect that the robot 2 is colliding with the human 5 or the like in a plurality of portions of the robot 2. When the robot 2 is colliding with the human 5 or the like in a plurality of portions, avoidance may be difficult in certain situations, such as when the collided entity is caught up in the arm 2A or the like. Upon detecting collision in a plurality of portions of the robot 2, the state estimation unit 20 may control the robot 2 to stop the robot 2.

<Example of Flowchart>

Figure 3:
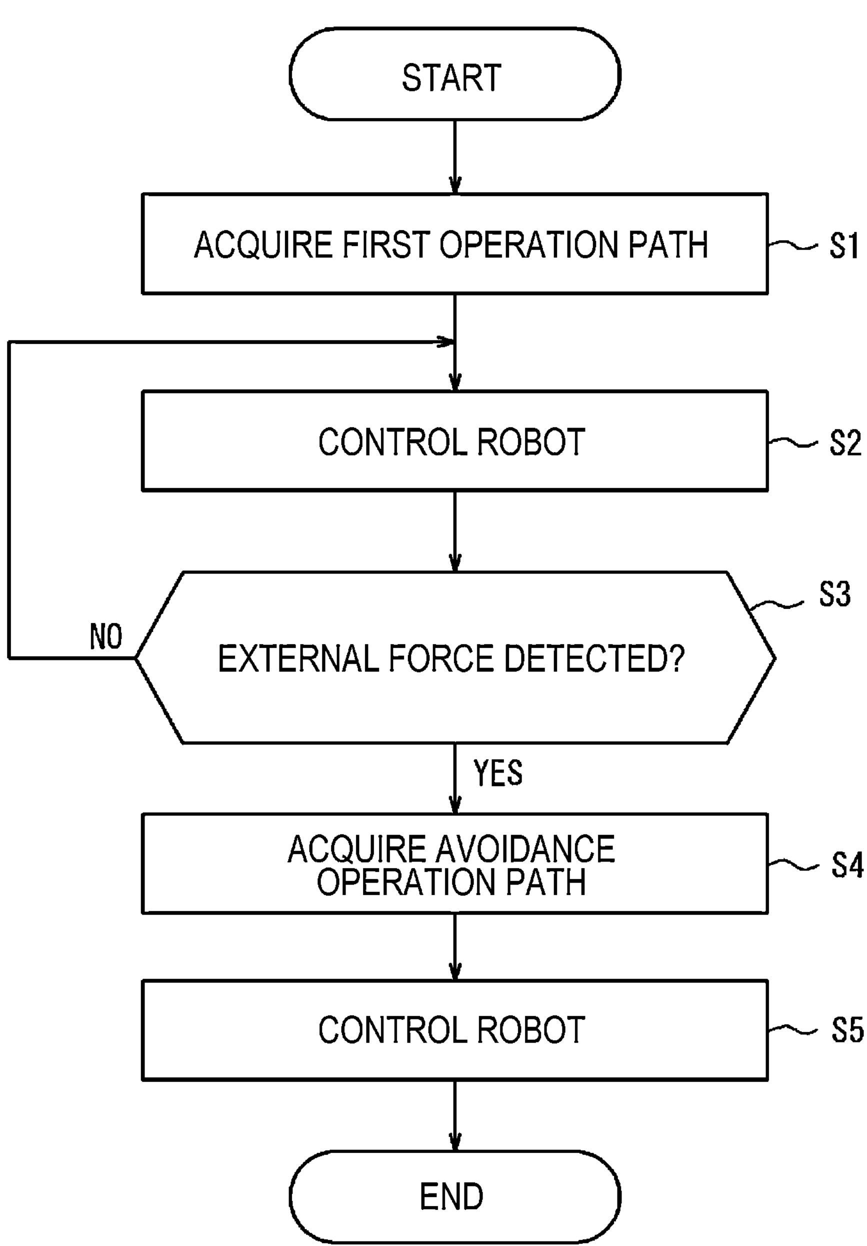
FIG. 3 is a flowchart illustrating an example of procedures of a robot control method according to an embodiment.
Figure 4:
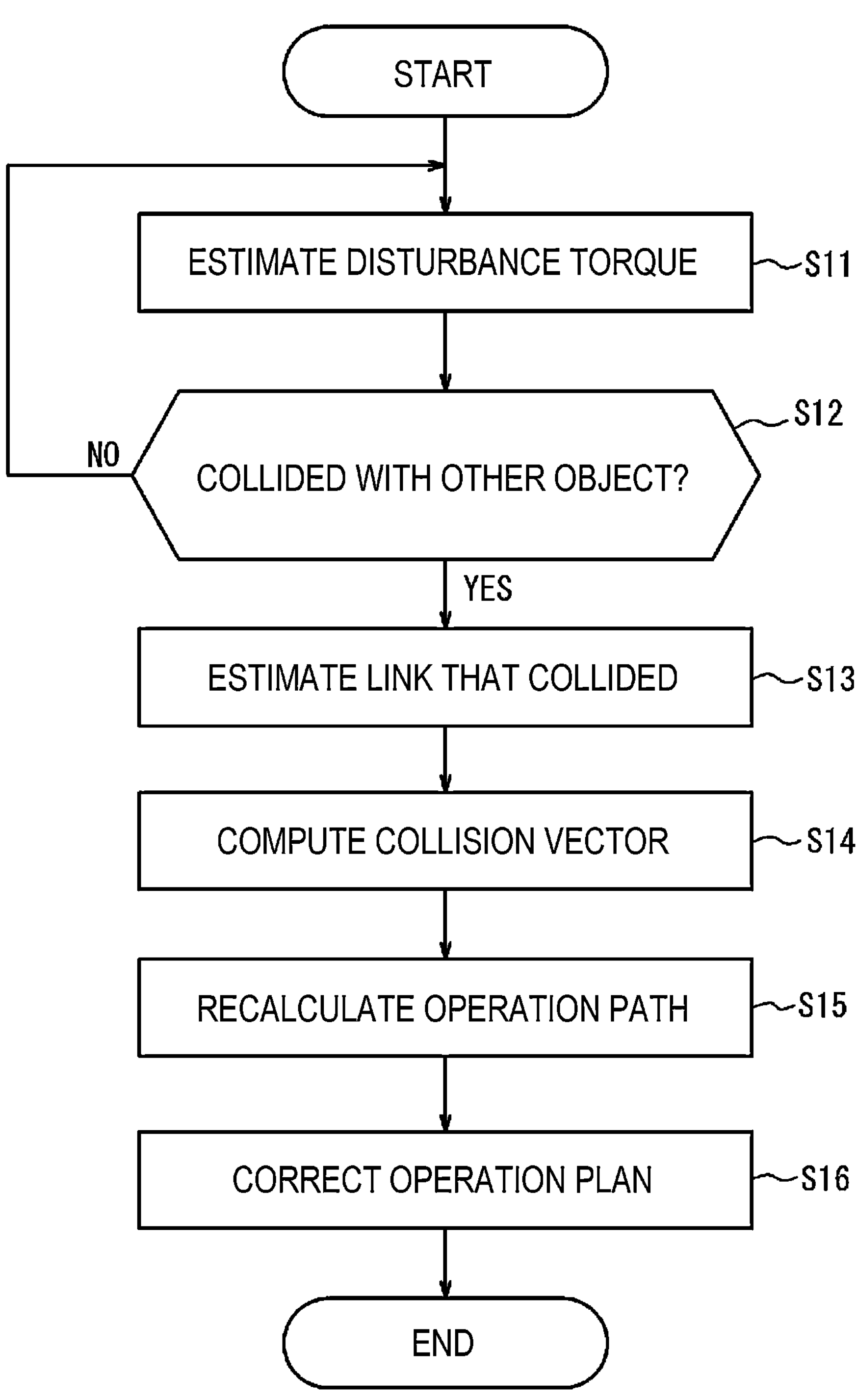
FIG. 4 is a flowchart illustrating an example of procedures for determining an avoidance operation by a robot.

The robot control apparatus 10 may execute a robot control method including the procedures of the flowcharts exemplified in FIGS. 3 and 4. The robot control method may also be achieved as a robot control program to be executed by a processor forming the robot control apparatus 10. The robot control program may be stored in a non-transitory computer-readable medium.

The robot control apparatus 10 may execute the following procedures exemplified in FIG. 3 and thereby control the robot 2 to reduce an external force applied to the robot 2. The operation control unit 40 (controller) of the robot control apparatus 10 acquires the first operation path (step S1). The operation control unit 40 (controller) of the robot control apparatus 10 controls the robot 2 to cause the robot 2 to operate along the first operation path (step S2). The state estimation unit 20 (controller) of the robot control apparatus 10 determines whether an external force applied to the robot 2 is detected (step S3). If the state estimation unit 20 (controller) does not detect an external force (step S3: NO), the operation control unit 40 (controller) of the robot control apparatus 10 returns to step S2 and continues the control of the robot 2. If the state estimation unit 20 (controller) detects an external force (step S3: YES), the operation control unit 40 (controller) of the robot control apparatus 10 acquires an avoidance operation path (step S4). The operation control unit 40 (controller) of the robot control apparatus 10 controls the robot 2 to cause the robot 2 to operate along the avoidance operation path (step S5). After the end of the procedure in step S5, the robot control apparatus 10 ends execution of the procedures of the flowchart in FIG. 3. After the end of the procedure in step S5, the robot control apparatus 10 may also return to the procedure in step S1 and reacquire the first operation path.

The robot control apparatus 10 may execute the following procedures exemplified in FIG. 4 and thereby detect an external force applied to the robot 2 and correct an action plan. The state estimation unit 20 (controller) of the robot control apparatus 10 estimates a disturbance torque (step S11). Specifically, the state estimation unit 20 (controller) of the robot control apparatus 10 may calculate the difference in torque (current) between the plant model 50 of the arm 2A and the actual arm 2A of the robot 2, and estimate a disturbance torque on the basis of the difference in torque (current). The state estimation unit 20 (controller) of the robot control apparatus 10 determines whether the robot 2 has collided with a human or other object (step S12). Specifically, the state estimation unit 20 (controller) of the robot control apparatus 10 determines that the robot 2 has collided with a human or the like upon detecting an abnormal torque. If the robot 2 has not collided with another object (step S12: NO), the state estimation unit 20 (controller) of the robot control apparatus 10 returns to the procedure in step S11 and continues the estimation of the disturbance torque. The procedures in steps S11 and S12 of FIG. 4 correspond to the procedures in steps S2 and S3 of FIG. 3.

If the robot 2 has collided with another object (step S12: YES), the state estimation unit 20 (controller) of the robot control apparatus 10 estimates, for example, the link 2D that collided with another object (step S13). Specifically, the state estimation unit 20 (controller) of the robot control apparatus 10 infers which link 2D or joint 2B collided with another object on the basis of the torque of each link 2D or each joint 2B of the robot 2 and the abnormal torque. Note that when the arm 2A, link 2D, joint 2B, or end effector 2C has collided with another object, the state estimation unit 20 (controller) of the robot control apparatus 10 may estimate the arm 2A, link 2D, joint 2B, or end effector 2C that has collided with another object. The state estimation unit 20 (controller) of the robot control apparatus 10 calculates a collision vector with respect to the link 2D that has collided with another object (step S14). Specifically, the state estimation unit 20 (controller) of the robot control apparatus 10 calculates the collision vector on the basis of the differential velocity between the disturbance torque and the link 2D or joint 2B. The operation planning unit 30 of the robot control apparatus 10 or an external server that functions as the operation planning unit 30 recalculates the operation path of the robot 2 (step S15). Specifically, the operation planning unit 30 of the robot control apparatus 10 or an external server that functions as the operation planning unit 30 recalculates the operation path of the robot 2 to mitigate the collision energy, on the basis of the collision vector or collision torque of the link 2D or joint 2B. The procedures in steps S13 to S15 of FIG. 4 correspond to the procedure in step S4 of FIG. 3.

The operation planning unit 30 of the robot control apparatus 10 or an external server that functions as the operation planning unit 30 corrects the operation plan on the basis of the recalculated operation path (step S16). The operation control unit 40 (controller) of the robot control apparatus 10 can mitigate collision between the robot 2 and another object by controlling the robot 2 on the basis of the corrected operation plan. The procedure in step S16 of FIG. 4 corresponds to the procedure in step S5 of FIG. 3. After execution of the procedure in step S16, the robot control apparatus 10 ends execution of the procedures of the flowchart in FIG. 4.

As described above, according to the robot control apparatus 10 and robot control method as in the present embodiment, the energy of collision is mitigated when the robot 2 collides with another object. This reduces the likelihood that the robot 2 will contact the collided object even more strongly or contact an object or the like other than the collided object. The result is an improvement in the reliability of avoidance actions by the robot 2.

Other Embodiments

The state estimation unit 20 (controller) is configured to estimate an external force applied to the robot 2 on the basis of a change in the motor current of the robot 2. The state estimation unit 20 (controller) may detect collision with at least a part of the robot 2 on the basis of the estimated external force. The state estimation unit 20 (controller) may detect collision with at least a part of the robot 2 when the external force is greater than a first threshold value. The operation control unit 40 (controller) may decrease the operating speed of an operation by the robot 2 along the first operation path if the external force estimated by the state estimation unit 20 does not exceed the first threshold value. Decreasing the operating speed of an operation by the robot 2 along the first operation path means decreasing the operating speed when the robot 2 executes the normal operation. The state estimation unit 20 (controller) may detect collision with at least a part of the robot 2 on the basis of the acceleration of the robot 2. The state estimation unit 20 (controller) may also detect a collision direction of the robot 2 on the basis of the acceleration of the robot 2.

The state estimation unit 20 (controller) may detect collision with at least a part of the robot 2 on the basis of a measurement value of the motor current of the joint 2B measured by a current sensor and a measurement value of the acceleration of the link 2D, joint 2B, or the like measured by an acceleration sensor. Specifically, when the robot 2 collides with something and stops moving, the measurement value of the acceleration of the link 2D, joint 2B, or the like of the robot 2 goes to zero or a near-zero value. On the other hand, the measurement value of the motor current of the joint 2B goes to a deviated value from the estimate value of the current obtained by the state estimation unit 20 estimating the state of the robot 2. Consequently, the state estimation unit 20 (controller) may detect that at least a part of the robot 2 has collided with the human 5 or the like when the measurement value of the acceleration of the link 2D, joint 2B, or the like of the robot 2 is zero or a near-zero value, and the difference between the measurement value of the motor current of the joint 2B and the estimated value of the current according to the state estimation unit 20 is a predetermined value or greater.

The motor current of the joint 2B increases or decreases in response to feedback control after collision occurs. Consequently, in the case of detecting collision on the basis of only the measurement value of the motor current of the joint 2B, collision detection may be delayed compared to the case of detecting collision on the basis of the measurement value of the acceleration of the link 2D or joint 2B. In the case of detecting collision on the basis of only a sensor 3 which is either a current sensor or an acceleration sensor, the accuracy of collision detection may be a trade-off between robustness to the situation and the sensing speed. Consequently, detecting collision on the basis of sensors 3 including both a current sensor and an acceleration sensor may alleviate the trade-off described above. If the delay time between when collision occurs and when the motor current of the joint 2B changes does not pose a problem realistically, the state estimation unit 20 (controller) may also detect collision on the basis of the measurement value of the motor current of the joint 2B, without using the measurement value of the acceleration.

The operation control unit 40 (controller) may cause the robot 2 to execute an avoidance operation until the external force applied to the robot 2 is less than a second threshold value. The operation control unit 40 (controller) may change the operating speed of the avoidance operation on the basis of the magnitude of the external force applied to the robot 2. The operation control unit 40 (controller) may interrupt the power supply of the robot 2 if the robot 2 cannot execute the avoidance operation within a predetermined time.

When the state estimation unit 20 (controller) detects collision with at least a part of the robot 2, the operation planning unit 30 may generate a second operation path as an operation path to mitigate the energy of collision. The second operation path may be generated on the basis of the collision direction of the robot 2. The second operation path may be generated such that at least an initial path of the second operation path includes a component opposite to the collision direction of the robot 2.

The operation planning unit 30 may also be configured as a server external to the robot control apparatus 10, such as a server that performs computations in a cloud computing environment. When the operation planning unit 30 is configured as a server external to the robot control apparatus 10, the state estimation unit 20 (controller) may output a result of estimating the state of the robot 2 to the external operation planning unit 30. The operation control unit 40 (controller) may acquire an operation path from the external operation planning unit 30. That is, the operation control unit 40 (controller) may be configured to acquire an operation path not only from internally in the robot control apparatus 10, but also externally.

The foregoing describes embodiments of the robot control system 1, but in the present disclosure, an embodiment may also be achieved as a method or program for implementing a system or device, or as a storage medium (such as an optical disc, magneto-optical disc, CD-ROM, CD-R, CD-RW, magnetic tape, hard disk, or memory card, for example) in which a program is recorded. The program may be stored in a non-transitory computer-readable medium.

An embodiment in the form of a program is not limited to an application program such as object code compiled by a compiler or program code to be executed by an interpreter, and may also be in a form such as a program module incorporated into an operating system. The program may or may not be configured so that all processing is performed solely in a CPU on a control board. The program may also be configured to be implemented, in part or in full, by another processing unit mounted on an expansion board or expansion unit added to the board as needed.

The foregoing description of embodiments according to the present disclosure is based on the drawings and examples, but note that a person skilled in the art could make various variations or revisions on the basis of the present disclosure. Consequently, it is to be understood that these variations or revisions are included in the scope of the present disclosure. For example, the functions and the like included in each component and the like may be rearranged in logically non-contradictory ways. A plurality of components or the like can be combined into one, or a single component can be divided.

In the present disclosure, qualifiers such as "first" and "second" are identifiers for distinguishing configurations. The numerals denoting the configurations distinguished by qualifiers such as "first" and "second" in the present disclosure are interchangeable. For example, the identifiers "first" and "second" may be interchanged between the first operation path and the second operation path. The identifiers are interchanged at the same time. The configurations are still distinguished after the interchange of the identifiers. The identifiers may be removed. The configurations with the identifiers removed therefrom are distinguished by signs. The description of identifiers such as "first" and "second" in the present disclosure shall not be used as a basis for interpreting the order of the configurations or the existence of identifiers with smaller numbers.

REFERENCE SIGNS

- 1 robot control system
- 2 robot (2A: arm, 2B: joint, 2C: end effector, 2D: link)
- 3 sensor
- 4 camera
- 5 human
- 6 movement path
- 10 robot control apparatus (20: state estimation unit, 30: operation planning unit, 40: operation control unit, 50: plant model, 60: interface, 70: target designation unit, 80: spatial information acquisition unit)

The invention claimed is:

1. A robot control method comprising:
causing a robot to operate along a first operation path;
acquiring, upon detecting collision with at least a part of the robot, an avoidance operation path on which the robot would operate to mitigate energy of the collision;
causing, upon acquiring the avoidance operation path, the robot to execute an avoidance operation along the avoidance operation path; and
interrupting a power supply of the robot when the robot cannot execute the avoidance operation within a predetermined time.

2. A robot control apparatus comprising:
a controller configured to control a robot, wherein
the controller includes an operation control unit comprising at least one processor configured to cause the robot to operate along a first operation path and a state estimation unit comprising at least one processor configured to estimate a state of the robot,
when the state estimation unit detects collision with at least a part of the robot, the operation control unit is configured to acquire an avoidance operation path on which the robot would operate to mitigate energy of the collision, and upon acquiring the avoidance operation path, the operation control unit is configured to cause the robot to execute an avoidance operation along the avoidance operation path, and
the operation control unit is configured to interrupt a power supply of the robot when the robot cannot execute the avoidance operation within a predetermined time.

3. The robot control apparatus according to claim 2, wherein the avoidance operation path is a second operation path different from the first operation path.

4. The robot control apparatus according to claim 2, wherein the avoidance operation path is the first operation path.

5. The robot control apparatus according to claim 2, wherein
the state estimation unit is configured to estimate an external force applied to the robot on the basis of a change in a motor current of the robot, and detect collision of the robot on the basis of the estimated external force.

6. The robot control apparatus according to claim 5, wherein the state estimation unit is configured to detect collision of the robot when the external force is greater than a first threshold value.

7. The robot control apparatus according to claim 5, wherein if the state estimation unit estimates the external force but the external force does not exceed the first threshold value, the operation control unit is configured to decrease an operating speed of the operation of the robot along the first operation path.

8. The robot control apparatus according to claim 5, wherein the state estimation unit is configured to detect collision of the robot on the basis of an acceleration of the robot.

9. The robot control apparatus according to claim 8, wherein the state estimation unit is configured to detect collision direction of the robot on the basis of an acceleration of the robot.

10. The robot control apparatus according to claim 5, wherein
the controller further includes an operation planning unit comprising at least one processor configured to generate an operation path of the robot, and
when the state estimation unit detects the collision, the operation planning unit is configured to generate, as the operation path of the robot, an avoidance operation path to mitigate energy of the collision.

11. The robot control apparatus according to claim 5, wherein the avoidance operation path is generated on the basis of the collision direction of the robot.

12. The robot control apparatus according to claim 11, wherein at least an initial path of the avoidance operation path includes a component opposite to the collision direction.

13. The robot control apparatus according to claim 5, wherein the operation control unit is configured to change an operating speed of the avoidance operation on the basis of a magnitude of the external force.

14. The robot control apparatus according to claim 2, wherein the operation control unit is configured to stop the robot if the state estimation unit detects collision with a plurality of portions of the robot.

15. A robot control system comprising:

the robot control apparatus according to claim 1; and the robot.

16. A robot control apparatus comprising:

a controller configured to control a robot, wherein the controller includes an operation control unit comprising at least one processor configured to cause the robot to operate along a first operation path and a state estimation unit comprising at least one processor configured to estimate a state of the robot, and when the state estimation unit detects collision with at least a part of the robot, the operation control unit is configured to acquire an avoidance operation path on which the robot would operate to mitigate energy of the collision, and upon acquiring the avoidance operation path, the operation control unit is configured to cause the robot to execute an avoidance operation along the avoidance operation path;

wherein the state estimation unit is configured to estimate an external force applied to the robot on the basis of a change in a motor current of the robot, and detect collision of the robot on the basis of the estimated external force, wherein the state estimation unit is configured to detect collision of the robot when the external force is greater than a first threshold value, and wherein the operation control unit is configured to cause the robot to execute the avoidance operation until the external force is less than a second threshold value.

* * * * *